United States Patent [19]

Meixner et al.

[11] Patent Number: 4,753,817
[45] Date of Patent: Jun. 28, 1988

[54] PROCESS FOR THE PRODUCTION OF UV-HARDENED OPAQUELY PIGMENTED COATINGS

[75] Inventors: Jürgen Meixner, Krefeld; Wolfgang Kremer, Kerken; Manfred Müller, Erkelenz, all of Fed. Rep. of Germany

[73] Assignee: Bayer Aktiengesellschaft, Leverkusen, Fed. Rep. of Germany

[21] Appl. No.: 33,045

[22] Filed: Mar. 30, 1987

[30] Foreign Application Priority Data

Apr. 12, 1986 [DE] Fed. Rep. of Germany ....... 3612442

[51] Int. Cl.$^4$ ............................................. B05D 3/06
[52] U.S. Cl. ..................................... 427/54.1; 427/44
[58] Field of Search ........................................ 427/54.1

[56] References Cited

U.S. PATENT DOCUMENTS

| | | | |
|---|---|---|---|
| 4,005,244 | 1/1977 | Wismer et al. | 427/54.1 |
| 4,208,005 | 6/1980 | Nate et al. | 427/44 |
| 4,222,835 | 9/1980 | Dixon | 427/54.1 |
| 4,451,523 | 5/1984 | Nativi et al. | 427/44 |

*Primary Examiner*—John H. Newsome
*Attorney, Agent, or Firm*—Connolly & Hutz

[57] ABSTRACT

Opaquely pigmented coatings can be produced from lacquers based on monomer-free air-drying polyesters by means of UV radiation if hydroperoxides are additionally employed alongside UV initiators.

4 Claims, No Drawings

PROCESS FOR THE PRODUCTION OF UV-HARDENED OPAQUELY PIGMENTED COATINGS

The invention relates to a process for the production of UV-hardened opaquely pigmented coatings of high scratch resistance and solvent resistance based on unsaturated polyesters which are free from copolymerizable monomers (such as, for example, styrene). The process is particularly suitable for coating wood, wood-like materials and films of plastic.

The production of UV-hardened opaquely pigmented coatings has from the beginning presented serious problems which it has so far not been possible to solve, because the opaque pigment does not allow the UV radiation to penetrate into lower layers. Compromises have therefore been sought, but these have not been able to make their mark on the market. Thus, it has already been proposed to add incompatible polymers to UV-hardenable unsaturated polyester resins in order to imitate an opaque coating with the opacity resulting from the different refractive indices (DE-OS (German Published Specification) No. 2,426,602), to achieve an opaque effect by inclusion of microbubbles in the coating (J. Paint Technol. 45, No. 584 (1973), 73) and to use fillers with a very low covering power, instead of pigments, and thereby to enable the UV radiation to penetrate into lower layers (DE-AS (German Published Specification) No. 1,621,820).

The coatings obtainable in this manner do not have a sufficient covering power or have insufficient elasticity. Another problem is the frequently inadequate storage stability of the coating material.

Surprisingly, it has now been found that coating agents based on a combination of (1) so-called air-drying polyesters which are free from copolymerizable monomers and (2) cellulose nitrate, if appropriate dissolved in an inert organic solvent, can be used for the production of UV-hardened opaquely pigmented coatings if hydroperoxides are additionally used alongside UV initiators. Such formulations can have pot lives of about 5 hours at room temperature and, after an evaporation time of, for example, 2 to 3 minutes at 50° to 70° C., can be hardened directly under UV radiation, for example with high pressure mercury vapour lamps.

The invention thus relates to a process for the preparation of UV-hardened opaquely pigmented coatings, in which a polyester lacquer of 100 parts by weight of air-drying polyester, 0.1 to 10, preferably 0.2 to 4, parts by weight of cellulose nitrate, 0 to 30% by weight, based on the cellulose nitrate, of a plasticizer for cellulose nitrate, 10 to 150 parts by weight of pigment, 1 to 10 parts by weight of hydroperoxide, as an initiator, 0.005 to 1 part by weight of siccative, 0.5 to 5 parts by weight of photoinitiator and, if appropriate, customary additives is applied in an amount of 60 to 150 g/m² to the substrate and the lacquer film is pregelled for 1 to 5, preferably 2 to 3, minutes at a temperature of 50 to 80, preferably 60° to 75° C. and is then hardened under UV radiation.

Preferred air-drying polyesters are polycondensation products of at least one α,β-ethylenically unsaturated dicarboxylic acid with, as a rule, 4 or 5 C atoms or ester-forming derivatives thereof (for example their anhydrides), if appropriate mixed with up to 200 mol %, based on the unsaturated acid component, of one or more aliphatic saturated dicarboxylic acid with 4 to 10 C atoms or cycloaliphatic or aromatic dicarboxylic acid with 8 to 10 C atoms or ester-forming derivatives thereof (for example their anhydrides), with at least one hydroxy compound which is trihydric or polyhydric and has 3 to 8 C atoms, in which the OH groups which are not employed for the polycondensation are at least partly etherified with β,γ-ethylenically unsaturated alcohols, if appropriate one or more dihydric hydroxy compounds with 2 to 8 C atoms and if appropriate one or more monohydric hydroxy compounds with 1 to 18 C atoms—that is to say polyesters such as are described, for example, in DE-AS (German Published Specification) No. 1,024,654, German Patent Specification No. 2,221,335 and Wagner/Sarx, "Lackkunstharze" ("Lacquer Synthetic Resins"), 5th edition, Carl Hanser Verlag, Munich 1971, pages 139 and 140.

Examples of unsaturated dicarboxylic acids which are preferably to be used, or their derivatives, are maleic acid or maleic anhydride and fumaric acid. However, it is also possible to use, for example, mesaconic acid, citraconic acid, itaconic acid or chloromaleic acid. Examples of the aliphatic saturated and cycloaliphatic and aromatic dicarboxylic acids to be used, or their derivatives, are phthalic acid and phthalic anhydride, isophthalic acid, terephthalic acid, hexa- and tetrahydrophthalic acid or anhydrides thereof, endomethylenetetrahydrophthalic acid and the anhydride thereof, succinic acid or succinic anhydride and succinic acid esters and chlorides, adipic acid and sebacic acid. In order to prepare polyesters which are difficult to ignite, hexachloroendomethylenetetrahydrophthalic acid, tetrachlorophthalic acid or tetrabromophthalic acid, for example, can be used. Ethylene glycol, propane-1,2-diol, propane-1,3-diol, diethylene glycol, dipropylene glycol, butane-1,3-diol, butane-1,4-diol, neopentylglycol, hexane-1,6-diol, 2,2-bis(4-hydroxycyclohexyl)-propane or bis-oxyalkylated bisphenol A can be used; suitable preferred hydroxy compounds for introducing the β,γ-ethylenically unsaturated ether groups are trimethylolpropane mono- and diallyl ether, glycerol mono- and diallyl ether and pentaerythritol mono-, di- and triallyl ether. The polyesters to be used according to the invention preferably contain at least 10% by weight, in particular at least 20% by weight, based on the polyester, of radicals of β,γ-ethylenically unsaturated ether groups.

Monovalent hydroxy compounds which are preferred for the preparation of the polyester are alkanols, cycloalkanols and cycloalkanealkanols, for example n-hexanol, n-octanol, n-decanol, laurol, stearyl alcohol and hexahydrobenzyl alcohol, and preferably branched alkanols, such as 2-ethyl-1-hexanol and isononanols.

The acid numbers of the polyesters should be 1–40, preferably 10–30, the OH numbers should be 10–100, preferably 20–50, and the molecular weights determined as the number-average should be 300–5,000, preferably 500–2,000.

Preferred cellulose nitrates are the customary grades of collodion cotton, for example cellulose nitrate with a nitrogen content of 10.2 to 12.4% by weight.

It is not essential to the invention whether the collodion cotton used is a butanol-, isopropanol-, ethanol-, methanol- or water-moist form or whether celluloid-like compositions (generally called chips), that is to say with gelatinizing plasticizers, are used.

Preferred plasticizers for cellulose nitrates are, in particular, phthalic acid esters and adipic acid esters of alcohols with 4 to 8 carbon atoms, for example dibutyl phthalate, diisobutylcarbinyl phthalate, dicyclohexyl phthalate, dioctyl phthalate, dibutyl phthalate and dioctyl adipate, phosphoric acid esters of alcohols with 6 to 10 carbon atoms, for example tricresyl phosphate, triphenyl phosphate, trioctyl phosphate, cresyl phenyl phosphate or dioctyl phenyl phosphate, and also diethylene glycol monolaurate, dipentaerythritol hexapropionate, 2-methoxyethyl-acetyl-tributyl aconitate, butoxy-ethyldiglycol carbonate, acetyltributyl citrate, triethylene glycol pelargonate, butyldiglycol carbonate, polyethylene glycol di-2-ethyl-hexoate, triethylene glycol di-2-ethyl butyrate, tributyl carballylate, dibutyl sebacate and benzenesulphonic acid N-methylamide.

Pigments which can be employed are the opaque ininorganic or organic pigments customary for unsaturated polyester lacquers, such as titanium dioxide, ultramarine blue, iron oxides and phthalocyanine blue.

Preferred hydroperoxides are, for example, tert.-butyl hydroperoxide, cumene hydroperoxide, methyl ethyl ketone hydroperoxide, diisopropylbenzene monohydroperoxide and hydrogen peroxide.

Siccatives are, for example, iron, lead, cobalt and manganese salts of acids such as linseed oil fatty acids, tallow oil fatty acids or soya bean fatty acids, of resin acids, such as abietic acid and naphthenic acid, or of acetic acid or isooctanoic acid. Cobalt octoate, cobalt naphthenate and cobalt acetate are preferred. Siccatives are preferably employed in the form of organic solutions.

Suitable photoinitiators are the compounds which are sufficiently known for radiation hardening, such as ketones, diketones, α-keto-alcohols and their derivatives. Preferred photoinitiators are benzoin and its derivatives, such as, for example, benzoin ethers (German Patent Specification No. 1,694,149), benzil ketals and hydroxyalkylphenones, for example benzoin isopropyl ether, benzil dimethyl ketal, 2-hydroxy-2-methyl-1-phenyl-propan-1-one and 1-hydroxycyclohexyl phenyl ketone.

The customary additives which are to be used if appropriate are, for example, fillers, thixotropic agents, smoothing agents, matting agents and flow control agents, and organic solvents, such as, for example, toluene, xylene, isopropanol and, in particular, butyl acetate. The amount of organic solvent is in general chosen such that the lacquers have a suitable processing viscosity.

The lacquers are outstandingly suitable for processing on conventional lacquering lines equipped with pouring machines. They can also be applied by rolling and spraying.

The percentages quoted in the following examples denote percentages by weight, and parts are parts by weight.

EXAMPLES

Polyesters used

Unsaturated polyesters with an acid number of 25, an OH number of 75 and a viscosity of 6,000 mPa.s, measured on an 80% strength solution in butyl acetate at 20° C., prepared from 1 mol of maleic anhydride, 0.85 mol of ethylene glycol, 0.15 mol of propylene glycol and 0.3 mol of trimethylolpropane diallyl ether.

The formulations shown in the table* were poured in an amount of 90 g/m² onto a wood substrate prewarmed to 40° C. The system was warmed at 70° C. for 3 minutes for evaporation of the solvent. The lacquer film was then hardened under UV radiation (2 high, pressure mercury vapour lamps each of 80 watt/cm, distance of the lamps from the lacquer 20 cm, rate of processing 3.5 m/minute). Examples 1–3 gave colourless hard scratch-resistant lacquerings which were absolutely resistant towards water and chemicals, whilst the comparison example led to a wrinkled lacquering which was not scratch-resistant.

*Viscosity according to DIN 53 211 (DIN cup no. 4 at 20° C.) corresponding to a flow time of 60 seconds

TABLE

|  | Examples | | | Comparison |
|---|---|---|---|---|
|  | 1 | 2 | 3 |  |
| 80% strength solution of the polyester in butyl acetate | 34 | 34 | 34 | 34 |
| 2.5% strength solution of nitrocellulose cotton in butyl acetate | 13 | 13 | 13 | — |
| Titanium dioxide (rutile type) | 17 | 17 | 28 | 17 |
| Barium sulphate | 11 | 11 | — | 11 |
| Xylene | 14 | 14 | 14 | 8 |
| Butyl acetate | 9 | 9 | 9 | 11 |
| 2-Hydroxy-2-methyl-1-phenylpropan-1-one | 0.7 | — | 0.7 | 0.7 |
| 1-Hydroxycyclohexyl phenyl ketone | — | 0.7 | — | — |
| Co octoate solution in xylene (2% metal content) | 0.6 | 0.6 | 0.6 | 0.6 |
| 50% strength dispersion of cyclohexanone hydroperoxide in dibutyl phthalate | 0.5 | 0.5 | 0.5 | 0.5 |
| Pot Life (hours) | 6–8 | 6–8 | 6–8 | 1 |

We claim:

1. Process for the production of UV-hardened opaquely pigmented coatings, in which a polyester lacquer of 100 parts by weight of a air-drying polyester which is free from copolymerizable monomers and which contains β,γ-ethylenically unsaturated ether groups, 0.1 to 10 parts by weight of cellulose nitrate, 0 to 30% by weight, based on the cellulose nitrate, of a plasticizer for cellulose nitrate, 10 to 150 parts by weight of pigment, 1 to 10 parts by weight of hydroperoxide, as an initiator, 0.005 to 1 part by weight of siccative, 0.5 to 5 parts by weight of photoinitiator and, if appropriate, customary additives is applied in an amount of 60 to 150 g/m² to the substrate and the lacquer film is pregelled for 1 to 5 minutes at a temperature of 50° to 80° C. and is then hardened under UV radiation.

2. Process according to claim 1, in which the polyester lacquer contains 0.2 to 4 parts by weight of cellulose nitrate per 100 parts by weight of polyester.

3. Process according to claim 1, in which the lacquer film is pregelled for 2 to 3 minutes.

4. Process according to claim 1, in which the lacquer film is pregelled at 60° to 75° C.

* * * * *